US005780002A

United States Patent [19]

Miyadera et al.

[11] Patent Number: 5,780,002
[45] Date of Patent: Jul. 14, 1998

[54] EXHAUST GAS CLEANER AND METHOD FOR CLEANING EXHAUST GAS

[75] Inventors: Tatsuo Miyadera, Tsukuba; Kiyohide Yoshida, Kumagaya; Mika Saito, Kumagaya; Naoko Irite, Kumagaya; Akira Abe, Kumagaya; Masataka Furuyama, Kumagaya, all of Japan

[73] Assignees: Jiro Hiraishi, Director-General of Agency of Industrial Science and Technology; Kabushiki Kaisha Riken, both of Tokyo, Japan

[21] Appl. No.: 890,641

[22] Filed: Jul. 9, 1997

Related U.S. Application Data

[63] Continuation of Ser. No. 458,586, Jun. 2, 1995, abandoned.

[30] Foreign Application Priority Data

| Nov. 4, 1994 | [JP] | Japan | 6-295822 |
| Nov. 10, 1994 | [JP] | Japan | 6-301478 |
| Nov. 24, 1994 | [JP] | Japan | 6-314034 |
| Nov. 28, 1994 | [JP] | Japan | 6-317633 |

[51] Int. Cl.$^6$ .................. B01D 53/56; B01D 53/94
[52] U.S. Cl. ............. 423/239.1; 423/213.2; 423/213.5; 423/213.7; 423/245.3
[58] Field of Search ............ 423/213.2, 213.7, 423/239.1, 239.2, 245.3, 213.5

[56] References Cited

U.S. PATENT DOCUMENTS

| 3,397,034 | 8/1968 | Tulleners et al. | 23/2 |
| 3,896,616 | 7/1975 | Keith et al. | 60/274 |
| 5,208,202 | 5/1993 | Muramatsu et al. | 423/213.2 |
| 5,227,145 | 7/1993 | Kintaichi et al. | 423/239.1 |
| 5,443,803 | 8/1995 | Miznuo et al. | 423/213.2 |
| 5,534,237 | 7/1996 | Yoshida et al. | 423/237.1 |
| 5,589,432 | 12/1996 | Yoshida et al. | 502/325 |
| 5,658,542 | 8/1997 | Yoshida et al. | 423/213.2 |
| 5,658,543 | 8/1997 | Yoshida et al. | 423/213.2 |
| 5,714,130 | 2/1998 | Saito et al. | 423/239.1 |

FOREIGN PATENT DOCUMENTS

| 0475173 | 3/1992 | European Pat. Off. | 423/239.1 |
| 0577438 | 1/1994 | European Pat. Off. | |
| 0605251 | 7/1994 | European Pat. Off. | |
| 4131954 | 3/1992 | Germany. | |
| 1-130735 | 11/1987 | Japan. | |
| 63-283727 | 4/1988 | Japan. | |
| 63-100919 | 5/1988 | Japan. | |
| 4281844 | 10/1992 | Japan. | |
| 5-92125 | 4/1993 | Japan | 423/213.2 |
| 6126186 | 5/1994 | Japan | 423/239.2 |
| 6142523 | 5/1994 | Japan | 423/239.1 |
| 6178937 | 6/1994 | Japan | 423/239.1 |
| 6198130 | 7/1994 | Japan. | |
| 6198195 | 7/1994 | Japan. | |
| 6238164 | 8/1994 | Japan | 423/245.3 |
| 6262078 | 9/1994 | Japan | 423/239.1 |
| 6277454 | 10/1994 | Japan | 423/239.1 |
| 2236493 | 4/1991 | United Kingdom. | |

OTHER PUBLICATIONS

"Selective Catalytic Oxidation . . . " By Iwamoto et al. (No Month).
"New Frontiers in Catalysis" Proceedings of the 10th International Congress on Catalysis, (1993), Elsevier Science Pub., pp. 1285–1294.
"Applied Catalysis B: Environmental", vol. 2, (1993), pp. 199–205.
"Alumina—Supported Silver . . . " By Miyadera (No Month).

*Primary Examiner*—Gary P. Straub
*Assistant Examiner*—Timothy C. Vanoy
*Attorney, Agent, or Firm*—Browdy and Neimark

[57] ABSTRACT

An exhaust gas cleaner is constituted of an Ag catalyst carrying an Ag component and a base metal catalyst carrying a Cu component and optionally W, V, Mo components, and a noble metal catalyst carrying a noble metal component. The base metal catalyst and the noble metal catalyst may be physically mixed to form a mixed catalyst. Another exhaust gas cleaner is constituted of the first Ag catalyst carrying an Ag component, the second Ag catalyst carrying an Ag component, a base metal catalyst carrying a Cu component and optionally W, V, Mo components, and a noble metal catalyst carrying a noble metal component. The second Ag catalyst carries the Ag component in an amount larger than that of the first Ag catalyst. The noble metal catalyst is physically mixed with the base metal catalyst to form a mixed catalyst. The exhaust gas cleaner can effectively remove nitrogen oxides in a wide temperature range of exhaust gas.

14 Claims, No Drawings

EXHAUST GAS CLEANER AND METHOD FOR CLEANING EXHAUST GAS

This application is a continuation of application Ser. No. 08/458,586, filed Jun. 2, 1995 now abandoned.

BACKGROUND OF THE INVENTION

The present invention relates to an exhaust gas cleaner for effectively removing nitrogen oxides by reduction from an exhaust gas containing nitrogen oxides and an excess amount of oxygen, and a method for cleaning an exhaust gas with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than its stoichiometric amount relative to unburned components such as carbon monoxide, hydrogen, hydrocarbons in the exhaust gas. The term "nitrogen oxides" (NOx) means nitrogen monoxide and/or nitrogen dioxide.

The nitrogen oxides are one cause of acid rain, posing a serious problem of environmental pollution. For these reasons, various methods have been proposed to remove nitrogen oxides from exhaust gases emitted from various combustion equipment.

In the case of large, stationary combustion apparatuses such as large combustion apparatuses of factories, ammonia is introduced into an exhaust gas, whereby nitrogen oxides in the exhaust gas are catalytically and selectively reduced (selective catalytic reduction).

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There is an alternative method for reducing NOx, which comprises contacting an exhaust gas containing oxygen and NOx with a gaseous reducing agent such as hydrogen, carbon monoxide and hydrocarbons (non-selective catalytic reduction). However, this method requires a larger amount of the reducing agent than its stoichiometric amount relative to oxygen in the exhaust gas to carry out effective removal of NOx. Accordingly, this method is effective only for the exhaust gas having a relatively low oxygen concentration, which is generated by burning nearly at a theoretical air-fuel ratio.

There have been proposed methods of reducing nitrogen oxides by adding to an exhaust gas a reducing agent in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735).

However, these methods are effective only in a narrow temperature range. Also, their efficiency of removing nitrogen oxides is extremely low in the case of an actual exhaust gas because it contains about 10% of moisture and the temperature thereof largely depends on the operating condition.

OBJECT AND SUMMARY OF THE INVENTION

Accordingly, an object of the present invention is to provide an exhaust gas cleaner and a method capable of efficiently removing nitrogen oxides by reduction from an exhaust gas containing nitrogen oxides and oxygen in an amount larger than the stoichiometric amount relative to unburned components such as carbon monoxide, hydrogen, hydrocarbons, etc., which is discharged from stationary combustion apparatuses, gasoline engines operated under oxygen excess conditions, and diesel engines.

As a result of intense research in view of the above objects, the inventors have found that (1) nitrogen-containing compounds such as alkyl nitrites, ammonia, etc. and aldehydes are by-produced when an exhaust gas, together with an externally added reducing agent such as hydrocarbons and oxygen-containing organic compounds is brought into contact with an Ag catalyst comprising an porous inorganic oxide carrying an Ag component, (2) the nitrogen-containing compounds can be effectively reduced into nitrogen on a base metal catalyst comprising a porous inorganic oxide carrying a Cu component alone or in combination with W, V, Mo components, and (3) the remaining hydrocarbons and carbon monoxide are oxidized on a noble metal catalyst comprising a porous inorganic oxide carrying a noble metal component. Based on these findings, the inventors have further found that nitrogen oxides can be effectively removed even from an exhaust gas containing 10% moisture at a wide temperature range when the exhaust gas is, after being added with the reducing agent, brought into contact with an exhaust gas cleaner comprising the Ag catalyst, the base metal catalyst and the noble metal catalyst or comprising the Ag catalyst and a mixed catalyst of the base metal catalyst and noble metal catalyst.

The inventors have still further found that the by-produced aldehydes can be advantageously utilized to reduce nitrogen oxides when the Ag catalyst is made from two types of Ag catalysts wherein the first catalyst, which was set in the upper stream of the exhaust gas, contained smaller amount of Ag than the second one. The present invention has been completed based on these findings.

Thus, in a first aspect of the present invention, there is provided an exhaust gas cleaner for removing nitrogen oxides by reduction, which comprises (1) an Ag catalyst comprising the first porous inorganic oxide supporting 0.2–15 weight % of at least one Ag component selected from the group consisting of Ag and compounds of Ag, (2) a base metal catalyst comprising the second porous inorganic oxide supporting 0.2–30 weight % of at least one Cu component selected from the group consisting of oxides and sulfates of Cu, and optionally 30 weight % or less of at least one component selected from the group consisting of oxides and sulfates of V, and oxides and sulfides of W and Mo, and (3) a noble metal catalyst comprising the third porous inorganic oxide supporting 0.01–5 weight % of at least one noble metal component selected from the group consisting of Pt, Pd, Ru, Rh, Ir and Au.

In a second aspect of the present invention, there is provided an exhaust gas cleaner for removing nitrogen oxides by reduction, which comprises (1) an Ag catalyst comprising the first porous inorganic oxide supporting 0.2–15 weight % of at least one Ag component selected from the group consisting of Ag and compounds of Ag, and (2) a mixed catalyst of (a) a base metal catalyst comprising the second porous inorganic oxide supporting 0.2–30 weight % of at least one Cu component selected from the group consisting of oxides and sulfates of Cu, and optionally 30 weight % or less of at least one component selected from the group consisting of oxides and sulfates of V, and oxides and sulfides of W and Mo, and (b) a noble metal catalyst comprising the third porous inorganic oxide supporting 0.01–5 weight % of at least one noble metal component selected from the group consisting of Pt, Pd, Ru, Rh, Ir and Au.

In a third aspect of the present invention, there is provided an exhaust gas cleaner for removing nitrogen oxides by reduction, which comprises (1) a first Ag catalyst comprising a first porous inorganic oxide supporting 0.2–12 weight % of at least one Ag component selected from a group consisting of Ag and compounds of Ag, (2) a second Ag catalyst comprising the first porous inorganic oxide supporting 0.5–15 weight % of at least one Ag component selected from the group consisting of Ag and compounds of Ag, the amount of the Ag component carried on the second Ag catalyst being larger than that of the first Ag catalyst, and (3) a base metal catalyst comprising a second porous inorganic oxide supporting 0.2–30 weight % of at least one Cu component selected from the group consisting of oxides and sulfates of Cu, and optionally 30 weight % or less of at least one component selected from the group consisting of oxides and sulfates of V, and oxides and sulfides of W and Mo.

In a fourth aspect of the present invention, there is provided an exhaust gas cleaner for removing nitrogen oxides by reduction, which comprises (1) a first Ag catalyst comprising a first porous inorganic oxide supporting 0.2–12 weight % of at least one Ag component selected from a group consisting of Ag and compounds of Ag, (2) a second Ag catalyst comprising the first porous inorganic oxide supporting 0.5–15 weight % of at least one Ag component selected from the group consisting of Ag and compounds of Ag, the amount of the Ag component carried on the second Ag catalyst being larger than that of said first Ag catalyst, and (3) a mixed catalyst of (a) a base metal catalyst comprising a second porous inorganic oxide supporting 0.2–30 weight % of at least one Cu component selected from the group consisting of oxides and sulfates of Cu, and optionally 30 weight % or less of at least one component selected from the group consisting of oxides and sulfates of V, and oxides and sulfides of W and Mo, and (b) a noble metal catalyst comprising a third porous inorganic oxide supporting 0.01–5 weight % of at least one noble metal component selected from the group consisting of Pt, Pd, Ru, Rh, Ir and Au.

In a fifth aspect of the present invention, there is provided a method for removing nitrogen oxides by reduction from an exhaust gas containing nitrogen oxides and oxygen in an amount larger than its stoichiometric amount relative to unburned components in said exhaust gas, which comprises (1) disposing an exhaust gas cleaner as defined above in a flow path of the exhaust gas; (2) introducing into the exhaust gas at least one reducing agent selected from the group consisting of hydrocarbons and oxygen-containing organic compounds on an upstream side of the exhaust gas cleaner; and (3) bringing the resulting exhaust gas containing the reducing agent into contact with the exhaust gas cleaner at 150°–600° C., thereby causing a reaction of the nitrogen oxides with the reducing agent to remove the nitrogen oxides by reduction.

DETAILED DESCRIPTION OF THE PREFERRED EMBODIMENTS

The first preferred exhaust gas cleaner of the present invention comprises an Ag catalyst on the inlet side, a noble metal catalyst on the outlet side and a base metal catalyst disposed between the Ag catalyst and the base metal catalyst.

The second preferred exhaust gas cleaner of the present invention comprises an Ag catalyst on the inlet side, and a mixed catalyst of a base metal catalyst and a noble metal catalyst on the outlet side.

The third preferred exhaust gas cleaner of the present invention comprises an first Ag catalyst on the inlet side, a base metal catalyst on the outlet side and a second Ag catalyst disposed between the first Ag catalyst and the base metal catalyst.

The fourth preferred exhaust gas cleaner of the present invention comprises the first Ag catalyst on the inlet side, a mixed catalyst of a base metal catalyst and a noble metal catalyst on the outlet side and the second Ag catalyst disposed between the first Ag catalyst and the mixed catalyst.

The exhaust gas cleaner of the present invention may be basically in two forms.

The exhaust gas cleaner of the first preferred form is obtained by coating on a cleaner substrate at least one catalyst comprising a powdery porous inorganic oxide carrying one or more catalytically active components. The exhaust gas cleaner of such a form may be also obtained by coating the catalytically active components onto a porous inorganic oxide powder coated on a cleaner substrate. Preferable materials for the cleaner substrate include porous, heat-resistant ceramics having a large specific surface area such as γ-alumina, titania, zirconia and their composite oxides such as γ-alumina-titania, γ-alumina-silica, γ-alumina-zirconia, titania-zirconia, etc. When a high heat resistance is required, cordierite, mullite, alumina or its composite oxides are preferable. Also, the cleaner substrate may be formed from a known metal material.

The shape and size of the cleaner substrate may be changed depending on applications. Practically, the cleaner substrate may be fabricated from two parts or more such as an inlet portion, an intermediate portion, an outlet portion, etc. The cleaner substrate may be of a three-dimensional structure such as a honeycomb, a foam, a refractory fiber assembly, etc. Further, the cleaner substrate may be of granules or pellets. Each of the catalysts may be coated on different portions of the same cleaner substrate. Alternatively, each catalyst may be coated on separate cleaner substrates, and thereafter, fabricated into an exhaust gas cleaner.

The exhaust gas cleaner of a second preferred form may be produced by charging into a suitable reactor such as a catalytic converter, which is equipped with at least inlet and outlet portions, each of the catalysts obtained by coating one or more catalytically active components on to a pelletized, granular or powdery porous inorganic oxide, or obtained by forming a porous inorganic oxide carrying one or more catalytically active components into pellet, granule or powder.

In the following description and claims, the weight percentage of the catalytically active component is expressed by metal basis and based on the amount of porous inorganic oxide on which the component concerned is carried.

[A] Ag Catalyst

The Ag catalyst comprises a first porous inorganic oxide supporting at least one Ag component selected from the group consisting of Ag and compounds of Ag. In the third and fourth preferred embodiment of the present invention, the Ag catalyst is made of two parts, i.e., a first Ag catalyst and a second Ag catalyst which carries an Ag component in a larger amount than in the first Ag catalyst.

[A-1] Ag component

The Ag component is at least one of Ag and compounds of Ag. The compounds of Ag may include oxides of Ag, halides of Ag, sulfates of Ag and phosphates of Ag. Preferred Ag component is Ag, oxides of Ag, AgCl and $Ag_2SO_4$, and more preferred are Ag, oxides of Ag and AgCl.

The amount of the Ag component supported on a first porous inorganic oxide is 0.2–15 weight %, and preferably 0.5–12 weight %. When the amount is less than 0.2 weight %, the removal ratio of the nitrogen oxides is low. On the other hand, the amount exceeding 1 5 weight % also decreases the NOx removal ratio because the reducing agent such as hydrocarbons and oxygen-containing organic compounds is likely to be predominantly burnt.

In the Ag catalyst made of two parts, the amount of the Ag component of the first Ag catalyst is 0.2–12 weight %, and preferably 0.5–10 weight %. When the amount is less than 0.2 weight %, the removal ratio of the nitrogen oxides is low. On the other hand, the amount exceeding 15 weight % also decreases the NOx removal ratio because the reducing agent such as hydrocarbons and oxygen-containing organic compounds is likely to be predominantly burnt.

The amount of the Ag component of the second Ag catalyst is 0.5–15 weight %, preferably 1–12 weight %, and should be larger than that of the first Ag catalyst. When the amount is less than 0.5 weight % or less than that of the first Ag catalyst, the reduction of NOx by the aldehyde generated on the first Ag catalyst does not proceed sufficiently. On the other hand, the amount exceeding 15 weight % also decreases the NOx removal ratio because the reducing agent such as hydrocarbons and oxygen-containing organic compounds is likely to be predominantly burnt.

[A-2] First porous inorganic oxide

The first porous inorganic oxide is at least one heat-resistant porous ceramic having a large specific surface area selected from the group consisting of alumina, silica, titania, zirconia, zeolite and composite oxides thereof, and preferably at least one of γ-alumina, titania, zeolite and composite oxides thereof. These oxides promote the reaction of the nitrogen oxides with the reducing agent such as hydrocarbons and oxygen-containing organic compounds or remaining hydrocarbons in exhaust gas.

The specific surface area of the first porous inorganic oxide is preferably 10 $m^2$/g or more, and more preferably 30 $m^2$/g or more. When the specific surface area is smaller than 10 $m^2$/g, the catalytically active component supported on the porous inorganic oxide does not come into contact with the exhaust gas in a large contact area, failing to remove nitrogen oxides efficiently.

[A-3] Preparation of Ag catalyst

The Ag catalyst, including the first and second Ag catalysts, is prepared by coating the Ag component onto the porous inorganic oxide described above by known methods such as an impregnation method, a precipitation method, etc.

Ag and/or Ag oxides may be coating by immersing the porous inorganic oxide into an aqueous solution of silver nitrate, etc., drying at about 50°–150° C., preferably at about 70° C., and then subjecting the dried product to calcination by heating it stepwise from about 100° C. to about 600° C. in air, nitrogen gas stream containing oxygen or hydrogen gas stream. When the calcination is conducted in hydrogen gas stream, the calcined product is preferably to be subjected to oxidation treatment at 300°–650° C.

Silver sulfate may be coating, for example, by immersing the porous inorganic oxide in a solution of silver sulfate in aqueous nitric acid, and then followed by the same drying and calcination steps as described above.

Silver phosphate may be coated, for example, by immersing the porous inorganic oxide in an aqueous solution of silver nitrate while adding little by little phosphoric acid or ammonium phosphate under stirring. The mixture is further stirred for 4 hours while shielding the light. After drying, the resulting porous inorganic oxide is calcined at 120° C. for one hour, 450° C. for 3 hours, and 600° C. for 3 hours to obtain a porous inorganic oxide carrying silver phosphate.

When silver halide is to be carried, the porous inorganic oxide impregnated with an aqueous solution of silver nitrate, etc. is further immersed in an aqueous solution of ammonium halide to convert the silver nitrate into silver halide precipitation, and then followed by the same drying and calcination steps as described above.

It has been observed that the Ag component carried on the porous inorganic oxide forms circular aggregate upon the calcination in oxidative atmosphere. The average diameter, determined arithmetically, of the aggregate is 10–10000 nm, preferably 10–5000 nm, and more preferably 10–2000 nm. Generally the smaller the average diameter of the aggregate, the higher the activity of the Ag catalyst. However, when the average diameter is less than 10 nm, the reducing agent (hydrocarbons and/or oxygen-containing organic compounds) is likely to be predominantly oxidized, resulting in a decrease in the removal ratio of nitrogen oxides. On the other hand, when the average diameter is larger than 10000 nm, the catalytic activity of the Ag component becomes low, resulting in a low removal ratio of nitrogen oxides.

The Ag catalyst, including the first and second Ag catalysts, may be coated on a cleaner substrate as described above by known methods such as a wash-coating method, etc. The thickness of the Ag catalyst coated on the cleaner substrate is preferably up to 300 μm, though it is usually restricted by the difference in a thermal expansion coefficients between the Ag catalyst and the cleaner substrate. With such thickness, it is possible to prevent the cleaner from being broken by a thermal shock, etc. during NOx-removing operations.

The amount of the Ag catalyst coated onto a surface of the cleaner substrate is preferably 20–300 g/liter, more preferably 50–200 g/liter based on the cleaner substrate. When the amount is less than 20 g/liter, a sufficient removal ratio of the nitrogen oxides cannot be achieved. On the other hand, an amount more than 300 g/liter gives no detectable increase in removal efficiency, but results in a higher loss of pressure.

[B] Base Metal Catalyst

The base metal catalyst comprises a second porous inorganic oxide supporting a Cu component alone or in combination with W, V, Mo components. With the base metal catalyst, nitrogen oxides and alkyl nitrites and ammonia generated on the Ag catalyst are effectively reduced to nitrogen.

[B-1] Cu component

The Cu component is at least one of oxides and sulfates of Cu.

The amount of the Cu component supported on a second porous inorganic oxide is 0.2–30 weight %, preferably 0.5–25 weight %.

[B-2] W, V, Mo components

The W, V, Mo components are at least one of oxides and sulfates of V, and oxides and sulfides of W and Mo. Oxides of W and V and sulfates of V are more preferred.

The amount of the W, V, Mo components supported on the second porous inorganic oxide is 30 weight % or less, and preferably 25 weight % or less.

The total amount of the Cu component and the W, V, Mo components is 0.2–60 weight %, preferably 0.5–50 weight %.

[B-3] Second porous inorganic oxide

The second porous inorganic oxide is at least one heat-resistant porous ceramic having a large specific surface area selected from the group consisting of alumina, silica, titania, zirconia, zeolite and composite oxides thereof. At least one of γ-alumina, titania, zeolite and composite oxides thereof is preferred.

The specific surface area is preferably 10 m²/g or more.

[B-4] Preparation of base metal catalyst

The Cu component and W, V, Mo components may be coated onto the second porous inorganic oxide basically in the same manner as in the preparation of the Ag catalyst.

As the solution in which the second inorganic oxide is to be immersed, an aqueous solution of copper sulfate, copper nitrate, copper acetate, etc. may be used for coating the Cu component, and an aqueous solution of ammonium salt, oxalate, etc. of W, V and Mo for the W, V, Mo components. When both the Cu component and W, V, Mo components are coated, the second porous inorganic oxide may be immersed in a solution dissolving both the components, or successively immersed in solutions of each component.

Titania carrying the W, V, Mo components may be prepared by using metatitanic acid (hydrated titanium oxide) as the starting material in place of titania.

The base metal catalyst may be coated on a cleaner substrate. The thickness and the coated amount is the same as in the Ag catalyst.

[C] Noble metal catalyst

The noble metal catalyst comprises the third porous inorganic oxide supporting a noble metal component. The noble metal catalyst is disposed at the outlet side of the exhaust gas cleaner and is concerned in the reduction of NOx at a low temperature range and the oxidation of carbon monoxide and hydrocarbons. Further, the noble metal catalyst is optionally mixed with the base metal catalyst to present a mixed catalyst on which the reduction by the base metal catalyst and the oxidation by the noble metal catalyst proceed simultaneously without adversely affecting each other.

[C-1] Noble metal component

The noble metal component is one or more of Pt, Pd, Ru, Rh, Ir and Au, and one or more of Pt, Pd, Ru, Rh and Au is preferable. At least one of Pt, Pd and Au is more preferred.

The amount of the noble metal component supported on the third porous inorganic oxide is 0.01-5 weight %, and preferably 0.01-4 weight %. The amount more than 5 weight % gives no additional improvement in the removal efficiency.

The noble metal catalyst may further carry 10 weight % or less of at least one element selected from the group consisting of rare earth elements such as La, Ce, etc., alkaline earth elements such as Ca, Mg, etc. and alkali elements such as Na, K etc. to enhance the heat resistance of the noble metal catalyst.

[C-2] Third porous inorganic oxide

The third porous inorganic oxide is at least one porous and heat-resistant ceramic selected from the group consisting of alumina, titania, zirconia, silica, zeolite and composite oxides thereof. The specific surface area is preferably 10 m²/g or more.

[C-3] Preparation of noble metal catalyst

The noble metal component may be coated onto the third porous inorganic oxide basically in the same manner as in the preparation of the Ag catalyst.

For example, the third porous inorganic oxide is immersed in a solution containing the noble metal component, such as aqueous solution of chloroplatinic acid, chloroauric acid, palladium chloride, etc., and subjected to the same drying and calcination steps as in the preparation of the Ag catalyst. The noble metal component may exist either in the form of metal or oxide at working temperatures at which the cleaner is used.

The noble metal catalyst and a mixed catalyst of the base metal catalyst and noble metal catalyst may be coated on a cleaner substrate. The thickness and the coated amount is the same as in the Ag catalyst.

In the first preferred embodiment (Ag catalyst/base metal catalyst/noble metal catalyst), the weight ratio of the Ag catalyst to the base metal catalyst is 1:5 to 5:1, preferably 1:4 to 4:1. When the ratio is less than 1:5 (excess of the base metal catalyst), a sufficiently high removal ratio of the nitrogen oxides cannot be achieved in a wide temperature range of 150°–600° C. On the other hand, when the ratio is higher than 5:1 (excess of the Ag catalyst), the reaction between the reducing agent and NOx at relatively low temperatures, 400° C. or lower, does not proceed sufficiently. The weight ratio of the Ag catalyst to the noble metal catalyst is 1:5 to 5:1, preferably 1:4 to 4:1 for the same reason as set forth above.

In the second preferred embodiment (Ag catalyst/mixed catalyst of base metal catalyst and noble metal catalyst), the mixing ratio of the base metal catalyst to the noble metal catalyst is preferably 100:50 to 100:1, and more preferably 100:30 to 100:1 by weight. A mixing ratio higher than 100:1 unfavorably leads to decreased removal ratio of hydrocarbons and carbon monoxide. When the mixing ratio is lower than 100:50, a sufficiently high removal ratio of the nitrogen oxides cannot be achieved in a wide temperature range of 150°–600° C. The weight ratio of the Ag catalyst to the mixed catalyst is 1:5 to 10:1, preferably 1:4 to 5:1. When the weight ratio is less than 1:5, a sufficiently high removal ratio of the nitrogen oxides cannot be achieved in a wide temperature range of 150°–600° C. On the other hand, when the weight ratio is higher than 10:1, the nitrogen-containing compound such as alkyl nitrites, ammonia, etc. generated on the Ag catalyst is emitted without being reduced into nitrogen, or the removal ratios of carbon monoxide and hydrocarbons are reduced.

In the third embodiment (first Ag catalyst/second Ag catalyst/base metal catalyst) and fourth embodiment (first Ag catalyst/second Ag catalyst/mixed catalyst of base metal catalyst and noble metal catalyst), the weight ratio of the first Ag catalyst to the second Ag catalyst is 1:10 to 10:1, preferably 1:5 to 5:1. When the ratio is less than 1:10 (excess of the second Ag catalyst), a sufficiently high removal ratio of the nitrogen oxides cannot be achieved in a wide temperature range of 150°–600° C. On the other hand, when the ratio is higher than 10:1 (excess of the first Ag catalyst), the aldehyde generated on the first Ag catalyst is not effectively used for reducing NOx.

In the third embodiment, the weight ratio of the total amount of the first and second Ag catalysts to the base metal catalyst is 1:5 to 10:1, preferably 1:4 to 5:1. When the ratio is less than 1:5 (excess of the base metal catalyst), a sufficiently high removal ratio of the nitrogen oxides cannot be achieved in a wide temperature range of 150°–600° C. On the other hand, when the ratio is higher than 10:1 (excess of the first and second Ag catalysts), the nitrogen-containing compound such as alkyl nitrites, ammonia, etc. generated on the Ag catalyst is not effectively used to reduce NOx.

In the fourth embodiment, the mixing ratio of the base metal catalyst to the noble metal catalyst is preferably 100:50 to 100:1, and more preferably 100:30 to 100:1 by weight. A mixing ratio higher than 100:1 unfavorably leads to decreased removal ratio of hydrocarbons and carbon monoxide. When the mixing ratio is lower than 100:50, a sufficiently high removal ratio of the nitrogen oxides cannot be achieved in a wide temperature range of 150°–600° C. The weight ratio of the total amount of the first and second Ag catalysts to the mixed catalyst is 1:5 to 10:1, preferably 1:4 to 5:1. When the weight ratio is less than 1:5 (excess of the mixed catalyst), a sufficiently high removal ratio of the nitrogen oxides cannot be achieved in a wide temperature range of 150°–600° C. On the other hand, when the weight ratio is higher than 10:1 (excess of the first and second Ag catalyst), the nitrogen-containing compound such as alkyl nitrites, ammonia, etc. generated on the Ag catalyst is emitted without reduced into nitrogen, or the removal ratios of carbon monoxide and hydrocarbons are reduced.

[D] Method for cleaning exhaust gas

With the exhaust gas cleaner described above, NOx can be effectively removed even from exhaust gas containing about 10% moisture at a wide temperature range of 150°–600° C.

[D-1] Reducing agent

The exhaust gas usually contains residual hydrocarbons such as ethylene, propylene, etc. to some extent. Since the amount of residual hydrocarbons is not sufficient to reduce all nitrogen oxides in the exhaust gas, at least one reducing agent should be externally introduced into the exhaust gas. A site for introducing the reducing agent is an upstream side of the exhaust gas cleaner.

The reducing agent to be added to exhaust gas may include hydrocarbons and oxygen-containing organic compounds having at least two carbon atoms. A fuel containing such a reducing agent may be also usable.

The hydrocarbons are alkanes, alkenes and alkynes which may be gaseous or liquid at the normal state (25° C., 1 atm). The alkanes and alkenes are preferred to have 2 or more carbon atoms. The liquid hydrocarbons may be diesel oil, cetane, heptane, kerosene, gasoline, etc., and those having a boiling point of 50°–350° C. are preferable.

The oxygen-containing organic compound having at least two carbon atoms may include alcohols having two or more of carbon atoms such as ethanol, isopropyl alcohol, etc. A fuel, such as gasoline, diesel oil, kerosene, etc., containing the oxygen-containing organic compound may be also usable.

The weight ratio (the reducing agent externally added with or without the above fuel/nitrogen oxides in exhaust gas) is preferably 0.1–5. When the weight ratio is less than 0.1, the removal ratio of nitrogen oxides is not improved. On the other hand, when the weight ratio is more than 5, fuel efficiency is low.

The fuel to be introduce into the exhaust gas together with the reducing agent may be gasoline, light oil, kerosene, etc. The fuel containing the reducing agent may be introduced in an amount such that the weight ratio of the reducing agent/nitrogen oxides in the exhaust gas is 0.1–5.

[D-2] Contact time

The contact time between the exhaust gas and the exhaust gas cleaner is preferably 0.006 g.sec/ml or more, and more preferably 0.007 g·sec/ml or more. When the contact time is less than 0.006 g·sec/ml, the reduction of NOx is insufficient to result in a low NOx removal ratio.

[D-3] Apparent space velocity

To efficiently proceed the reduction of nitrogen oxides with the oxygen-containing organic compounds, hydrocarbons, alkyl nitrites or ammonia, the apparent space velocity of the exhaust gas passing through the exhaust gas cleaner is preferably controlled as described below depending upon the type of the cleaner.

In the exhaust gas cleaner of the first preferred embodiment, the space velocities are 150,000 $h^{-1}$ or less, preferably 100,000 $h^{-1}$ or less on the Ag catalyst and the base metal catalyst, and 200,000 $h^{-1}$ or less, preferably 150,000 $h^{-1}$ or less on the noble metal catalyst.

In the exhaust gas cleaner of the second preferred embodiment, the space velocities are 150,000 $h^{-1}$ or less, preferably 100,000 $h^{-1}$ or less on the Ag catalyst, and 200,000 $h^{-1}$ or less, preferably 150,000 $h^{-1}$ or less on the mixed catalyst of the base metal catalyst and the noble metal catalyst.

In the exhaust gas cleaner of the third and fourth preferred embodiments, the space velocities are 150,000 $h^{-1}$ or less, preferably 100,000 $h^{-1}$ or less on the first and second Ag catalysts, and 200,000 $h^{-1}$ or less, preferably 150,000 $h^{-1}$ or less on the base metal catalyst and the mixed catalyst of the base metal catalyst and the noble metal catalyst.

[D-4] Exhaust gas temperature

The exhaust gas passing through the exhaust gas cleaner where the reducing agent is allowed react to with nitrogen oxides is kept at 150°–600° C., preferably 200°–550° C. and more preferably 300°–500° C. When the temperature is lower than 150° C., the reduction of nitrogen oxides by the reducing agent cannot be sufficiently carried out. On the other hand, when the temperature is higher than 600° C., the reducing agent is burned before the reaction with the nitrogen oxides, failing to reduce the nitrogen oxides effectively.

The present invention will be described in further detail by way of the following Examples. In the following Examples, the weight percentage of the catalytically active component is expressed by metal basis based on the porous inorganic oxide on which the component concerned is carried.

EXAMPLE 1

11.7 g (apparent volume: 21.7 ml) of commercially available γ-alumina pellets (diameter: 0.5–2 mm, specific surface area: 200 $m^2/g$) were immersed in an aqueous solution of silver nitrate (0.76 g of silver nitrate in 22 ml of water) for 20 minutes. The pellets were then dried at 70°C. for 2 hours, heated to 600° C. stepwise and calcined there for 5 hours in air to prepare an Ag catalyst carrying 2.1 weight % of silver.

After being immersed in an aqueous solution of copper sulfate (copper concentration: 7.7 weight %), 3.1 g (apparent volume: 3.1 ml) of titania pellets (particle size: 0.5–2 mm, specific surface area: 50 $m^2/g$) were dried in air successively at 80° C., 100° C. and 120° C. each for 2 hours. The dried pellets were then heated from 120° C. to 500° C. and calcined there for 5 hours to prepare a base metal catalyst carrying 4.4 weight % (metal basis) of copper sulfate.

Separately, after being immersed in an aqueous solution of chloroplatinic acid for 20 minutes, 15.5 g (apparent volume: 15.5 ml) of titania pellets of the same type were dried in air at 80°C. for 2 hours. The dried pellets were calcined at 120° C. for 2 hours in nitrogen stream, and further calcined at 200°–40° C. for one hour while being heated stepwise. The pellets thus calcined were heated from 50° C. to 400° C. over 5 hours in nitrogen stream containing 4% hydrogen, and calcined at 400° C. for 4 hours. And the pellets were heated from 5020 C. to 500° C. over 5 hours in nitrogen stream containing 10% oxygen, and then calcined at 500° C. for 5 hours, thereby preparing an noble metal catalyst carrying 0.21 weight % of platinum.

An exhaust gas cleaner consisting of 1.7 g (apparent volume: 3.1 ml) of the Ag catalyst, 3.4 g (apparent volume: 3.1 ml) of the base metal catalyst and 3.1 g (apparent volume: 3.1 ml) of the noble metal catalyst in this order from the inlet side was disposed in a reactor tube. Next, a test gas having the composition shown in Table 1 was allowed to pass through the reactor tube at a flow rate of 2 liters per minute (the normal state: 25° C., 1 atm) while maintaining the test gas in the reactor tube at temperatures of 300°–500° C. to reduce nitrogen oxides with ethanol. The apparent space velocity on each of the Ag catalyst, base metal catalyst and noble metal catalyst was about 40,000 $h^{-1}$.

In the present invention, the removal ratio was determined as follows. The concentration of nitrogen oxides in the effluent gas from the exhaust gas cleaner was measured by a chemiluminescence-based NO/NOx analyzer to determine the removal ratio of nitrogen oxides. The removal ratio was calculated from the equation of $(NOx_{in}-NOx_{out})/(NOx_{in}) \times 100$. The results are shown in Table 3.

TABLE 1

| Component | Concentration (Volume/Volume) |
| --- | --- |
| Nitrogen monoxide | 1000 ppm |
| Oxygen | 10% |
| Ethanol | 1250 ppm |
| Carbon dioxide | 10% |
| Nitrogen | Balance |
| Water | 10 volume % of the total volume of the above components |

EXAMPLE 2

The noble metal catalyst carrying 0.19 weight % of palladium was prepared in the same manner as in the preparation of the noble metal catalyst of Example 1 except for using an aqueous solution of palladium chloride (palladium concentration: 0.5 weight %) in place of the aqueous solution of chloroplatinic acid.

An exhaust gas cleaner consisting of 1.7 g (3.1 ml) of the Ag catalyst of Example 1, 3.4 g (3.1 ml) of the base metal catalyst of Example 1 and 3.1 g (3.1 ml) of the above noble metal catalyst in this order from the inlet side was disposed in a reactor tube. The results of the same test as in Example 1 are shown in Table 3.

EXAMPLE 3

6.2 g (apparent volume: 6.2 ml) of titania pellets (diameter: 0.5-2 mm, specific surface area: 50 $m^2/g$) were immersed for 20 minutes in an aqueous solution of 2.9 g of ammonium tungstate para-pentahydrate, 1.5 g of oxalic acid and 8.6 ml of water. The pellets were dried in air successively at 80° C., 100° C. and 120° C. each for 2 hours, and then heated from 120° C. to 500° C. over 5 hours and calcined at 500° C. for 4 hours to prepare a catalyst carrying tungsten oxide (metal basis: 7.4 weight %). After immersed in an aqueous solution of copper sulfate (copper concentration: 9.0 weight %) for 20 minutes, 3.4 g (apparent volume: 3.1 ml) of the tungsten oxide/titania catalyst was dried and calcined in the same manner as in the preparation of the base metal catalyst of Example 1 to prepare a base metal catalyst carrying 3.7 weight % (metal basis) of copper sulfate and 7.4 weight % (metal basis) of tungsten oxide.

An exhaust gas cleaner consisting of 1.7 g (3.1 ml) of the Ag catalyst of Example 1, 3.7 g (3.1 ml) of the above base metal catalyst and 3.1 g (3.1 ml) of the noble metal catalyst of Example 1 in this order from the inlet side was disposed in a reactor tube. The results of the same test as in Example 1 are shown in Table 3.

EXAMPLE 4

The noble metal catalyst carrying 0.19 weight % of rhodium was prepared in the same manner as in the preparation of the noble metal catalyst of Example 1 except for using an aqueous solution of rhodium chloride (rhodium concentration: 0.5 weight %) in place of the aqueous solution of chloroplatinic acid.

An exhaust gas cleaner consisting of 1.7 g (3.1 ml) of the Ag catalyst of Example 1, 3.7 g (3.1 ml) of the base metal catalyst of Example 3 and 3.1 g (3.1 ml) of the above noble metal catalyst in this order from the inlet side was disposed in a reactor tube. The results of the same test as in Example 1 are shown in Table 3.

EXAMPLE 5

A catalyst carrying 3.8 weight % (metal basis) of vanadium oxide was prepared in the same manner as in the preparation of the catalyst carrying tungsten of Example 3 except for immersing titania pellets in an aqueous solution (vanadium concentration: 7.8 weight %) prepared by heating over a water bath a mixture of vanadium pentoxide, oxalic acid and water. Copper sulfate was further carried on the vanadium oxide/titania catalyst in the same manner as in Example 3 to prepare a base metal catalyst carrying 4.0 weight % (metal basis) of copper sulfate and 3.8 weight % (metal basis) of vanadium oxide.

An exhaust gas cleaner consisting of 1.7 g (3.1 ml) of the Ag catalyst of Example 1, 3.6 g (3.1 ml) of the above base metal catalyst and 3.1 g (3.1 ml) of the noble metal catalyst of Example 1 in this order from the inlet side was disposed in a reactor tube. The results of the same test as in Example 1 are shown in Table 3.

EXAMPLE 6

3.3 g (apparent volume: 3.1 ml) of the catalyst carrying oxide of vanadium prepared in the same manner as in Example 5 was immersed in an aqueous solution of copper nitrate (copper concentration: 9.5 weight %) for 20 minutes, and then dried and calcined in the same manner as in the preparation of the base metal catalyst of Example 1 to prepare a base metal catalyst carrying 3.8 weight % (metal basis) of copper oxide and 3.8 weight % (metal basis) of vanadium oxide.

An exhaust gas cleaner consisting of 1.7 g (3.1 ml) of the Ag catalyst of Example 1, 3.4 g (3.1 ml) of the above base metal catalyst and 3.1 g (3.1 ml) of the noble metal catalyst of Example 1 in this order from the inlet side was disposed in a reactor tube. The results of the same test as in Example 1 are shown in Table 3.

EXAMPLE 7

After being immersed in an aqueous solution of silver nitrate, commercially available γ-alumina (specific surface area: 200 $m^2/g$) was dried and calcined in the same manner as in the preparation of the Ag catalyst of Example 1 to prepare an Ag catalyst carrying 3 weight % of silver. 0.26 g of the Ag catalyst thus obtained was coated on a commercially available honeycomb cordierite filter (diameter: 20 mm, length: 8.3 mm, 400 cells/$in^2$), dried and then heated to 600° C. to be calcined there to prepare an Ag cleaner part.

Zeolite powder ($SiO_2$:$Al_2O_3$=27:1 (molar ratio), specific surface area: 320 $m^2/g$), was immersed in an aqueous solution of copper acetate and copper was supported on the zeolite by ion-exchange method. Then the zeolite was dried in air successively at 80° C., 100° C. and 120° C. each for 2 hours. The dried zeolite was then heated from 120° C. to 400° C. and calcined at 400° C. for 5 hours to prepare a base metal catalyst carrying 5.19 weight % (metal basis) of copper oxide. A honeycomb cordierite filter of the same type as above was coated with a slurry containing 0.23 g of the base metal catalyst thus obtained, and then dried and calcined in the same manner as above to prepare a base metal cleaner part.

Separately, after being immersed in an aqueous solution of chloroplatinic acid for 20 minutes, titania powder (specific surface area: 35 m²/g) was dried and calcined in the same manner as in the preparation of the noble metal catalyst of Example 1 to prepare a noble metal catalyst carrying 0.25 weight % of platinum. A honeycomb cordierite filter of the same type as above was coated with 0.26 g of the noble metal catalyst thus obtained, and then dried and calcined in the same manner as above to prepare a noble metal cleaner part.

An exhaust gas cleaner consisting of the Ag cleaner part, the base metal cleaner part and the noble metal cleaner part in this order from the inlet side was disposed in a reactor tube. Next, a test gas having the composition shown in Table 2 was allowed to pass through the reactor tube at a flow rate of 3.48 liters per minute (the normal state: 25° C., 1 atm) while maintaining the test gas in the reactor tube at temperatures of 350°–550° C. to reduce nitrogen oxides with ethanol. The apparent space velocity on each of the cleaner parts was about 80,000 h⁻¹. The results are shown in Table 3.

TABLE 2

| Component | Concentration (Volume/Volume) |
| --- | --- |
| Nitrogen monoxide | 800 ppm |
| Oxygen | 10% |
| Ethanol | 1560 ppm |
| Sulfur dioxide | 30% |
| Nitrogen | Balance |
| Water | 10 volume % of the total volume of the above components |

EXAMPLE 8

After immersed in an aqueous solution of copper nitrate (copper concentration: 7.7 weight %), titania powder (specific surface area: 35 m²/g) was dried and calcined in the same manner as in the preparation of the base metal catalyst of Example 1 to prepare a base metal catalyst carrying 4.5 weight % (metal basis) of copper oxide. A honeycomb cordierite filter of the same type as in Example 7 was coated with a slurry containing 0.26 g of the base metal catalyst thus obtained, and then dried and calcined in the same manner as in Example 7 to prepare a base metal cleaner part.

An exhaust gas cleaner consisting of the Ag cleaner part of Example 7, the above base metal cleaner part and the noble metal cleaner part of Example 7 in this order from the inlet side was disposed in a reactor tube. The results of the same test as in Example 7 are shown in Table 3.

COMPARATIVE EXAMPLE 1

An exhaust gas cleaner consisting of 1.7 g (3.1 ml) of the Ag catalyst of Example 1 and 3.1 g (3.1 ml) of the noble metal catalyst of Example 1 in this order from the inlet side was disposed in a reactor tube. The results of the same test as in Example 1 are shown in Table 3.

TABLE 3

| | Removal Ratio of Nitrogen Oxides (%) | | | | |
| --- | --- | --- | --- | --- | --- |
| | Exhaust Gas Temperature (°C.) | | | | |
| Examples | 300 | 350 | 400 | 450 | 500 |
| 1 | 75.2 | 92.7 | 92.5 | 79.6 | 64.9 |
| 2 | 79.7 | 97.1 | 94.2 | 80.4 | 62.5 |
| 3 | 73.4 | 92.1 | 95.9 | 85.6 | 66.4 |
| 4 | 80.9 | 96.2 | 96.1 | 84.9 | 66.8 |
| 5 | 74.1 | 91.7 | 89.6 | 77.2 | 65.3 |
| 6 | 79.8 | 92.8 | 89.1 | 76.5 | 60.9 |
| 7 | 68.1 | 80.5 | 83.7 | 82.0 | 78.6 |
| 8 | 48.4 | 69.8 | 77.1 | 80.9 | 76.8 |
| Comparative Example | | | | | |
| 1 | 64.5 | 79.5 | 78.7 | 73.6 | 59.9 |

As seen from Table 3, as compared with Comparative Example 1 where only the Ag and noble metal catalysts were used, Examples 1–8 showed high removal efficiency of nitrogen oxides over a wide temperature range of exhaust gas.

EXAMPLE 9

An Ag catalyst carrying 3.1 weight % of silver was prepared in the same manner as in the preparation of the Ag catalyst of Example 1 except for using commercially available γ-alumina powder (specific surface area: 200 m²/g) in place of the γ-alumina pellets. By using the Ag catalyst thus obtained, an Ag cleaner part was prepared in the same manner as in Example 7.

Next, a base metal catalyst carrying 4.4 weight % (metal basis) of copper sulfate was prepared in the same manner as in the preparation of the base metal catalyst of Example 1 except for using titania powder (specific surface area: 50 m²/g) in place of the titania pellet.

Further, a noble metal catalyst carrying 0.21 weight % of platinum was prepared in the same manner as in the preparation of the noble metal catalyst of Example 1 except for using the same type titania powder as above in place of the titania pellet.

A honeycomb cordierite filter of the same type as in the above Ag catalyst was coated with a slurry containing 0.26 g of a mixed catalyst of the base metal catalyst and the noble metal catalyst (weight ratio: 40:1), and then dried and calcined in the same manner as in the preparation of the above Ag cleaner part to prepare a base metal/noble metal cleaner part.

An exhaust gas cleaner consisting of the Ag cleaner part at the inlet side and the base metal/noble metal cleaner part at the outlet side was disposed in a reactor tube. The results of the same test as in Example 7 are shown in Table 4.

EXAMPLE 10

A base metal catalyst carrying 3.7 weight % (metal basis) of copper sulfate and 7.4 weight % (metal basis) of tungsten oxide was prepared in the same manner as in the preparation of the base metal catalyst of Example 3 except for using titania powder (specific surface area: 50 m²/g) in place of the titania pellet.

A base metal/noble metal cleaner part was prepared from a mixed catalyst of the above base metal catalyst and the noble metal catalyst of Example 9 in the same manner as in Example 9.

An exhaust gas cleaner consisting of the Ag cleaner part of Example 9 at the inlet side and the above base metal/noble metal cleaner part at the outlet side was disposed in a reactor tube. The results of the same test as in Example 9 are shown in Table 4.

EXAMPLE 11

A base metal catalyst carrying 4.0 weight % (metal basis) of copper sulfate and 3.8 weight % (metal basis) of vanadium oxide was prepared in the same manner as in the preparation of the base metal catalyst of Example 5 except for using titania powder (specific surface area: 50 m²/g) in place of the titania pellet.

A base metal/noble metal cleaner part was prepared from a mixed catalyst of the above base metal catalyst and the noble metal catalyst of Example 9 in the same manner as in Example 9 except for changing the weight ratio of the base metal catalyst to the noble metal catalyst to 20:1.

An exhaust gas cleaner consisting of the Ag cleaner part of Example 9 at the inlet side and the above base metal/noble metal cleaner part at the outlet side was disposed in a reactor tube. The results of the same test as in Example 9 are shown in Table 4.

EXAMPLE 12

A base metal catalyst carrying 4.5 weight % (metal basis) of copper oxide and 3.8 weight % (metal basis) of vanadium oxide was prepared in the same manner as in the preparation of the base metal catalyst of Example 6 except for using titania powder (specific surface area: 50 m²/g) in place of the titania pellet.

An exhaust gas cleaner consisting of the Ag cleaner part of Example 9 at the inlet side and the above base metal/noble metal cleaner part at the outlet side was disposed in a reactor tube. The results of the same test as in Example 9 are shown in Table 4.

EXAMPLE 13

After being immersed in an aqueous solution of copper nitrate (copper concentration: 9.5 weight %) for 20 minutes, titania powder was dried and calcined in the same manner as in the preparation of the base metal catalyst of Example 9 to prepare a base metal catalyst carrying 4.5 weight % (metal basis) of copper oxide.

A base metal/noble metal cleaner part was prepared from a mixed catalyst of the above base metal catalyst and the noble metal catalyst of Example 9 in the same manner as in Example 11.

An exhaust gas cleaner consisting of the Ag cleaner part of Example 9 at the inlet side and the above base metal/noble metal cleaner part at the outlet side was disposed in a reactor tube. The results of the same test as in Example 9 are shown in Table 4.

COMPARATIVE EXAMPLE 2

By using 0.26 g of the noble metal catalyst of Example 9, a noble metal cleaner part was prepared in the same manner as in the preparation of the base metal/noble metal cleaner part of Example 9.

An exhaust gas cleaner consisting of the Ag cleaner part of Example 9 at the inlet side and the above noble metal cleaner part at the outlet side was disposed in a reactor tube. The results of the same test as in Example 9 are shown in Table 4.

TABLE 4

| | Removal Ratio of Nitrogen Oxides (%) | | | | |
|---|---|---|---|---|---|
| | Exhaust Gas Temperature (°C.) | | | | |
| Examples | 300 | 350 | 400 | 450 | 500 |
| 9 | 65.2 | 78.5 | 82.7 | 82.5 | 76.6 |
| 10 | 63.4 | 75.8 | 82.1 | 85.9 | 78.8 |
| 11 | 64.1 | 74.5 | 81.7 | 89.6 | 77.2 |
| 12 | 69.8 | 78.7 | 82.8 | 89.1 | 76.6 |
| 13 | 45.4 | 64.5 | 75.4 | 78.3 | 74.3 |
| Comparative Example | | | | | |
| 2 | 20.5 | 32.5 | 38.7 | 42.6 | 40.5 |

As seen from Table 4, as compared with Comparative Example 2 where only the Ag and noble metal catalysts were used, Examples 9–13 showed high removal efficiency of nitrogen oxides over a wide temperature range of exhaust gas.

EXAMPLE 14

In the same manner as in the preparation of the Ag catalyst of Example 9, the first Ag cleaner part coated with the first Ag catalyst carrying 3.1 weight % of silver was prepared.

Separately, also in the same manner, the second Ag cleaner part coated with the second Ag catalyst carrying 5.0 weight % of silver was prepared.

Next, in the same manner as in the preparation of the base metal catalyst of Example 9, a base metal catalyst carrying 4.4 weight % (metal basis) of copper sulfate was prepared. By using a slurry containing 0.26 g of the above base metal catalyst, a base metal cleaner part was prepared in the same manner as above.

An exhaust gas cleaner consisting of the first Ag cleaner part, the second Ag cleaner part and the base metal cleaner part in this order from the inlet side was disposed in a reactor tube. The results of the same test as in Example 7 are shown in Table 5.

EXAMPLE 15

In the same manner as in the preparation of the base metal catalyst of Example 10, a base metal catalyst carrying 3.7 weight % (metal basis) of copper sulfate and 7.4 weight % (metal basis) of tungsten oxide was prepared. By using a slurry containing 0.26 g of the above base metal catalyst, a base metal cleaner part was prepared in the same manner as in Example 14.

An exhaust gas cleaner consisting of the first Ag cleaner part of Example 14, the second Ag cleaner part of Example 14 and the above base metal cleanerpart in this order from the inlet side was disposed in a reactor tube. The results of the same test as in Example 14 are shown in Table 5.

EXAMPLE 16

In the same manner as in the preparation of the base metal catalyst of Example 11, a base metal catalyst carrying 4.0 weight % (metal basis) of copper sulfate and 3.8 weight % (metal basis) of vanadium oxide was prepared. By using a slurry containing 0.26 g of the above base metal catalyst, a base metal cleaner part was prepared in the same manner as in Example 14.

An exhaust gas cleaner consisting of the first Ag cleaner part of Example 14, the second Ag cleaner part of Example 14 and the above base metal cleanerpart in this order from the inlet side was disposed in a reactor tube. The results of the same test as in Example 14 are shown in Table 5.

EXAMPLE 17

In the same manner as in the preparation of the base metal catalyst of Example 12, a base metal catalyst carrying 4.5 weight % (metal basis) of copper oxide and 3.8 weight % (metal basis) of vanadium oxide was prepared. By using a slurry containing 0.26 g of the above base metal catalyst, a base metal cleaner part was prepared in the same manner as in Example 14.

An exhaust gas cleaner consisting of the first Ag cleaner part of Example 14, the second Ag cleaner part of Example 14 and the above base metal cleanerpart in this order from the inlet side was disposed in a reactor tube. The results of the same test as in Example 14 are shown in Table 5.

EXAMPLE 18

In the same manner as in the preparation of the base metal catalyst of Example 13, a base metal catalyst carrying 4.5 weight % (metal basis) of copper oxide was prepared. By using a slurry containing 0.26 g of the above base metal catalyst, a base metal cleaner part was prepared in the same manner as in Example 14.

An exhaust gas cleaner consisting of the first Ag cleaner part of Example 14, the second Ag cleaner part of Example 14 and the above base metal cleanerpart in this order from the inlet side was disposed in a reactor tube. The results of the same test as in Example 14 are shown in Table 5.

EXAMPLE 19

In the same manner as in the preparation of the noble metal catalyst of Example 9, a noble metal catalyst carrying 0.21 weight % of platinum was prepared.

A honeycomb cordierite filter of the same type as in Example 14 was coated with a slurry containing 0.26 g of a mixed catalyst of the base metal catalyst of Example 14 and the above noble metal catalyst (weight ratio: 40:1), and then dried and calcined in the same manner as in Example 14 to prepare a base metal/noble metal cleaner part.

An exhaust gas cleaner consisting of the first Ag cleaner part of Example 14, the second Ag cleaner part of Example 14 and the above base metal/noble metal cleaner part in this order from the inlet side was disposed in a reactor tube. The results of the same test as in Example 14 are shown in Table 5.

EXAMPLE 20

A base metal/noble metal cleaner part was prepared in the same manner as in Example 19 except for using a mixed catalyst of the base metal catalyst of Example 15 and the noble metal catalyst of Example 19.

An exhaust gas cleaner consisting of the first Ag cleaner part of Example 14, the second Ag cleaner part of Example 14 and the above base metal/noble metal cleaner part in this order from the inlet side was disposed in a reactor tube. The results of the same test as in Example 14 are shown in Table 5.

EXAMPLE 21

A base metal/noble metal cleaner part was prepared from a mixed catalyst of the base metal catalyst of Example 16 and the noble metal catalyst of Example 19 in the same manner as in Example 19 except for changing the weight ratio of the base metal catalyst to the noble metal catalyst to 20:1.

An exhaust gas cleaner consisting of the first Ag cleaner part of Example 14, the second Ag cleaner part of Example 14 and the above base metal/noble metal cleaner part in this order from the inlet side was disposed in a reactor tube. The results of the same test as in Example 14 are shown in Table 5.

EXAMPLE 22

A base metal/noble metal cleaner part was prepared from a mixed catalyst of the base metal catalyst of Example 17 and the noble metal catalyst of Example 19 in the same manner as in Example 21.

An exhaust gas cleaner consisting of the first Ag cleaner part of Example 14, the second Ag cleaner part of Example 14 and the above base metal/noble metal cleaner part in this order from the inlet side was disposed in a reactor tube. The results of the same test as in Example 14 are shown in Table 5.

EXAMPLE 23

A base metal/noble metal cleaner part was prepared from a mixed catalyst of the base metal catalyst of Example 18 and the noble metal catalyst of Example 19 in the same manner as in Example 21.

An exhaust gas cleaner consisting of the first Ag cleaner part of Example 14, the second Ag cleaner part of Example 14 and the above base metal/noble metal cleaner part in this order from the inlet side was disposed in a reactor tube. The results of the same test as in Example 14 are shown in Table 5.

COMPARATIVE EXAMPLE 3

A first Ag cleaner part was prepared in the same manner as in Example 14 except for changing the coated amount of the first Ag catalyst to 0.52 g.

An exhaust gas cleaner consisting of the above first Ag cleaner part alone was disposed in a reactor tube. The results of the same test as in Example 14 are shown in Table 5.

TABLE 5

| | Removal Ratio of Nitrogen Oxides (%) | | | | |
|---|---|---|---|---|---|
| | Exhaust Gas Temperature (°C.) | | | | |
| Examples | 300 | 350 | 400 | 450 | 500 |
| 14 | 55.8 | 82.5 | 97.7 | 96.5 | 93.6 |
| 15 | 67.4 | 78.8 | 92.1 | 95.9 | 88.8 |
| 16 | 68.1 | 76.5 | 88.7 | 93.6 | 83.2 |
| 17 | 62.8 | 78.7 | 90.8 | 93.1 | 83.6 |
| 18 | 23.4 | 56.5 | 67.4 | 80.3 | 80.3 |
| 19 | 59.8 | 82.5 | 95.7 | 96.5 | 90.6 |
| 20 | 68.4 | 78.8 | 92.1 | 94.9 | 83.8 |
| 21 | 68.1 | 76.5 | 88.7 | 92.6 | 80.2 |
| 22 | 66.8 | 78.7 | 90.8 | 92.1 | 80.6 |
| 23 | 28.4 | 58.5 | 67.4 | 75.3 | 78.3 |
| Comparative Example | | | | | |
| 3 | 20.5 | 30.5 | 35.7 | 42.6 | 40.5 |

As seen from Table 5, as compared with Comparative Example 3 where only the first Ag catalyst was used, Examples 14–23 showed high removal efficiency of nitrogen oxides in a wide temperature range of exhaust gas.

As is described above in detail, by the exhaust gas cleaner according to the present invention, nitrogen oxides can be efficiently removed from the exhaust gas having an excess of oxygen over a wide temperature range. The exhaust gas cleaner and the method of the present invention are effective for removing nitrogen oxides from exhaust gases from various combustors, automobile engines, etc.

What is claimed is:

1. A method for removing nitrogen oxides by reduction from an exhaust gas containing nitrogen oxides, sulfur dioxide, and oxygen in an amount larger than the stoichiometric amount of said oxygen required for completely oxidizing unburned components in said exhaust gas, which comprises:

disposing an exhaust gas cleaner having an inlet side and an outlet side in a flow path of said exhaust gas;

introducing into said exhaust gas at least one reducing agent selected from the group consisting of hydrocarbons and oxygen containing organic compounds on an upstream side of said exhaust gas cleaner; and introducing the resulting exhaust gas containing said reducing agent to the inlet side of said exhaust gas cleaner wherein said exhaust gas containing said reducing agent is brought into contact with said exhaust gas cleaner at 150°–600° C., thereby causing a reaction of said nitrogen oxides with said reducing agent to remove said nitrogen oxides by reduction;

said exhaust gas cleaner consisting essentially of:

an Ag catalyst consisting essentially of a first porous inorganic oxide supporting 0.2–15 weight % of at least one Ag component selected from the group consisting of Ag and compounds of Ag;

a base metal catalyst consisting essentially of a second porous inorganic oxide supporting 0.2–30 weight % of at least one Cu component selected from the group consisting of oxides and sulfates of Cu, and optionally 30 weight % or less of at least one component selected from the group consisting of oxides and sulfates of V and oxides and sulfides of W and Mo; and a noble metal catalyst consisting essentially of a third porous inorganic oxide supporting 0.01–5 weight % of at least one component selected from the group consisting of Pt, Pd, Ru, Rh, Ir and Au, the weight percentages being expressed by metal basis and being based on the amount of each porous inorganic oxide, and said Ag catalyst, base metal catalyst and noble metal catalyst being disposed in this order from inlet side to outlet side of said exhaust gas cleaner.

2. The method for removing nitrogen oxides according to claim 1, wherein said compound of Ag is at least one compound selected from the group consisting of silver oxides, silver halides, silver sulfates and silver phosphates.

3. The method for removing nitrogen oxides according to claim 1, wherein each of said first, second and third porous inorganic oxides is independently at least one member selected from the group consisting of alumina, silica, titania, zirconia, zeolite and composite oxides thereof.

4. A method for removing nitrogen oxides by reduction from an exhaust gas containing nitrogen oxides, sulfur dioxide, and oxygen in an amount larger than the stoichiometric amount of said oxygen required for completely oxidizing unburned components in said exhaust gas, which comprises:

disposing an exhaust gas cleaner having an inlet side and an outlet side in a flow path of said exhaust gas;

introducing into said exhaust gas at least one reducing agent selected from the group consisting of hydrocarbons and oxygen containing organic compounds on an inlet side of said exhaust gas cleaner; and bringing the resulting exhaust gas containing said reducing agent into contact with said exhaust gas cleaner at 150°–600° C. by introducing said exhaust gas containing said reducing agent in the inlet side of said exhaust cleaner, thereby causing a reaction of said nitrogen oxides with said reducing agent to remove said nitrogen oxides by reduction;

said exhaust gas cleaner consisting essentially of:

an Ag catalyst consisting essentially of a first porous inorganic oxide supporting 0.2–15 weight % of at least one Ag component selected from the group consisting of Ag and compounds of Ag; and a mixed catalyst consisting essentially of a mixture of a base metal catalyst and a noble metal catalyst, said base metal catalyst consisting essentially of a second porous inorganic oxide supporting 0.2–30 weight % of at least one Cu component selected from the group consisting of oxides and sulfates of Cu, and optionally 30 weight % or less of at least one component selected from the group consisting of oxides and sulfates of V and oxides and sulfides of W and Mo, and said noble metal catalyst consisting essentially of a third porous inorganic oxide supporting 0.01–5 weight % of at least one component selected from the group consisting of Pt, Pd, Ru, Rh and Ir, the weight percentages being expressed by metal basis and being based on the amount of each porous inorganic oxide, and said Ag catalyst and said mixed catalyst being disposed in this order from the inlet side to the outlet side of said exhaust gas cleaner.

5. The method for removing nitrogen oxides according to claim 4, wherein the mixing ratio of said base metal catalyst and said noble metal catalyst is 100:1 to 100:50 by weight.

6. The method for removing nitrogen oxides according to claim 4, wherein said compound of Ag is at least one compound selected from the group consisting of silver oxides, silver halides, silver sulfates and silver phosphates.

7. The method for removing nitrogen oxides according to claim 4, wherein each of said first, second and third porous inorganic oxides is independently at least one member selected from the group consisting of alumina, silica, titania, zirconia, zeolite and composite oxides thereof.

8. A method for removing nitrogen oxides by reduction from an exhaust gas containing nitrogen oxides, sulfur dioxide, and oxygen in an amount larger than the stoichiometric amount of said oxygen required for completely oxidizing unburned components in said exhaust gas, which comprises:

disposing an exhaust gas cleaner having an inlet side and an outlet side in a flow path of said exhaust gas:

introducing into said exhaust gas at least one reducing agent selected from the group consisting of hydrocarbons and oxygen containing organic compounds on the inlet side of said exhaust gas cleaner; and bringing the resulting exhaust gas containing said reducing agent into contact with said exhaust gas cleaner at 150°–600° C. by introducing said exhaust gas containing said reducing agent into the inlet side of said exhaust gas cleaner, thereby causing a reaction of said nitrogen oxides with said reducing agent to remove said nitrogen oxides by reduction;

said exhaust gas cleaner consisting essentially of:

a first Ag catalyst consisting essentially of a first porous inorganic oxide supporting 0.2–12 weight % of at least one Ag component selected from the group consisting of Ag and compounds of Ag;

a second Ag catalyst consisting essentially of a second porous inorganic oxide supporting 0.5–15 weight % of at least one Ag component selected from the group consisting of Ag and compounds of Ag, the amount of the Ag component carried on said second Ag catalyst being larger than that of said first Ag catalyst; and a base metal catalyst consisting essentially of a third porous inorganic oxide supporting 0.2–30 weight % of at least one Cu component selected from the group consisting of oxides and sulfates of Cu, and optionally 30 weight % or less of at least one component selected from the group consisting of oxides and sulfates of V, and oxides and sulfides of W and Mo;

the weight percentages being expressed by metal basis and being based on the amount of each porous inorganic oxide, and said first Ag catalyst, second Ag catalyst and base metal catalyst being disposed in this order from the inlet side to the outlet side of said exhaust gas cleaner.

9. The method for removing nitrogen oxides according to claim 8, wherein said compound of Ag is at least one compound selected from the group consisting of silver oxides, silver halides, silver sulfates and silver phosphates.

10. The method for removing nitrogen oxides according to claim 8, wherein each of said first, second and third porous inorganic oxides is independently at least one member selected from the group consisting of alumina, silica, titania, zirconia, zeolite and composite oxides thereof.

11. A method for removing nitrogen oxides by reduction from an exhaust gas containing nitrogen oxides, sulfur dioxide, and oxygen in an amount larger than the stoichiometric amount of said oxygen required for completely oxidizing unburned components in said exhaust gas, which comprises:

disposing an exhaust gas cleaner having an inlet side and an outlet side in a flow path of said exhaust gas;

introducing into said exhaust gas at least one reducing agent selected from the group consisting of hydrocarbons and oxygen containing organic compounds on the inlet side of said exhaust gas cleaner; and bringing the resulting exhaust gas containing said reducing agent into contact with said exhaust gas cleaner at 150°–600° C. by introducing said exhaust gas containing said reducing agent into the inlet side of said exhaust gas cleaner, thereby causing a reaction of said nitrogen oxides with said reducing agent to remove said nitrogen oxides by reduction;

said exhaust gas cleaner consisting essentially of:

a first Ag catalyst consisting essentially of a first porous inorganic oxide supporting 0.2–12 weight % of at least one Ag component selected from the group consisting of Ag and compounds of Ag;

a second Ag catalyst consisting essentially of a second porous inorganic oxide supporting 0.5–15 weight % of at least one Ag component selected from the group consisting of Ag and compounds of Ag, the amount of the Ag component carried on said second Ag catalyst being larger than that of said first Ag catalyst;

a mixed catalyst consisting essentially of a mixture of a base metal catalyst and a noble metal catalyst, said base metal catalyst consisting essentially of a third porous inorganic oxide supporting 0.2–30 weight % of at least one Cu component selected from the group consisting of oxides and sulfates of Cu, and optionally 30 weight % or less of at least one component selected from the group consisting of oxides and sulfates of V, and oxides and sulfides of W and Mo, and said noble metal catalyst consisting essentially of a fourth porous inorganic oxide supporting 0.01–5 weight % of at least one component selected from the group consisting of Pt, Pd, Ru, Rh and Ir, the weight percentages being expressed by metal basis and being based on the amount of each porous inorganic oxide, and said first Ag catalyst, said second Ag catalyst, and said mixed catalyst being disposed in this order from the inlet side to the outlet side of said exhaust gas cleaner.

12. The method for removing nitrogen oxides according to claim 11, wherein the mixing ratio of said base metal catalyst and said noble metal catalyst is 100:1 to 100:50 by weight.

13. The method for removing nitrogen oxides according to claim 11, wherein said compound of Ag is at least one compound selected from the group consisting of silver oxides, silver halides, silver sulfates and silver phosphates.

14. The method for removing nitrogen oxides according to claim 11, wherein each of said first, second, third and fourth porous inorganic oxides is independently at least one member selected from the group consisting of alumina, silica, titania, zirconia, zeolite and composite oxides thereof.

* * * * *